(12) United States Patent
Lin et al.

(10) Patent No.: US 10,295,765 B2
(45) Date of Patent: May 21, 2019

(54) TO-CAN PHOTODIODE PACKAGE WITH INTEGRATED COUPLING MEMBER AND EXPOSED ACTIVE REGION, AND A RECEIVER OPTICAL SUBASSEMBLY (ROSA) USING THE SAME

(71) Applicant: Applied Optoelectronics, Inc., Sugar Land, TX (US)

(72) Inventors: Kai-Sheng Lin, Sugar Land, TX (US); YongXuan Liang, Stafford, TX (US); Justin Lii, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 180 days.

(21) Appl. No.: 15/413,514

(22) Filed: Jan. 24, 2017

(65) Prior Publication Data
US 2018/0210156 A1 Jul. 26, 2018

(51) Int. Cl.
| | |
|---|---|
| *G02B 6/42* | (2006.01) |
| *H04B 10/40* | (2013.01) |
| *H04B 10/60* | (2013.01) |
| *H04B 10/66* | (2013.01) |
| *H04B 10/69* | (2013.01) |

(52) U.S. Cl.
CPC ......... *G02B 6/4263* (2013.01); *G02B 6/4251* (2013.01); *G02B 6/4274* (2013.01); *H04B 10/40* (2013.01); *H04B 10/66* (2013.01); *H04B 10/69* (2013.01)

(58) Field of Classification Search
CPC .. G02B 6/4263; G02B 6/4251; G02B 6/4256; G02B 6/4262; G02B 6/4274; H04B 10/40; H04B 10/60; H04B 10/66; H04B 10/69
See application file for complete search history.

(56) References Cited

U.S. PATENT DOCUMENTS

| | | | | |
|---|---|---|---|---|
| 2001/0024551 A1* | 9/2001 | Yonemura | ............ | G02B 6/4246 385/88 |
| 2004/0076383 A1* | 4/2004 | Peng | ................... | H01S 5/02212 385/92 |
| 2005/0129372 A1* | 6/2005 | Zheng | .................. | G02B 6/4201 385/94 |
| 2005/0135777 A1* | 6/2005 | Aronson | ............. | H01S 5/02212 385/147 |

(Continued)

*Primary Examiner* — John R Lee
(74) *Attorney, Agent, or Firm* — Grossman Tucker Perreault & Pfleger; Norman S. Kinsella

(57) ABSTRACT

A photodiode package is disclosed that includes a TO-Can style body with an exposed sensor cavity that eliminates the necessity of an encapsulant dispensing process. The TO-Can body of the photodiode package includes an integrated coupling member to allow for coupling to a ROSA housing without an intermediate member. The photodiode package includes a base portion with a cylindrical wall portion that extends therefrom to form an optical coupling cavity. A surface of the base portion provides at least one mounting surface within the optical coupling cavity for coupling to a photodiode chip. The cylindrical wall may function as an integrated coupling member and may be used to directly couple the photodiode package, e.g., without an intermediate cap/ring, into a socket of a ROSA housing. The base portion and cylindrical wall may be formed from a single piece of material, or from multiple pieces depending on a desired configuration.

20 Claims, 7 Drawing Sheets

(56) References Cited

U.S. PATENT DOCUMENTS

| | | | |
|---|---|---|---|
| 2005/0141829 A1* | 6/2005 | Narayan | G02B 6/421 |
| | | | 385/93 |
| 2006/0088255 A1* | 4/2006 | Wu | G02B 6/2938 |
| | | | 385/92 |
| 2007/0081771 A1* | 4/2007 | Lim | G02B 6/4204 |
| | | | 385/93 |
| 2010/0008093 A1* | 1/2010 | Lin | H01L 31/0203 |
| | | | 362/365 |
| 2012/0051382 A1* | 3/2012 | Miao | G02B 6/4214 |
| | | | 372/50.1 |
| 2013/0034357 A1* | 2/2013 | Lim | G02B 6/4201 |
| | | | 398/79 |
| 2013/0108262 A1* | 5/2013 | Lim | G02B 6/4215 |
| | | | 398/43 |
| 2015/0372759 A1* | 12/2015 | Lim | G02B 6/42 |
| | | | 398/88 |
| 2016/0047997 A1* | 2/2016 | Amirkiai | G02B 6/4251 |
| | | | 385/14 |
| 2016/0047998 A1* | 2/2016 | Amirkiai | G02B 6/43 |
| | | | 385/14 |
| 2016/0050751 A1* | 2/2016 | Amirkiai | H05K 3/4682 |
| | | | 361/752 |
| 2017/0031118 A1* | 2/2017 | Kanan | G02B 6/4263 |
| 2017/0063465 A1* | 3/2017 | Lin | H01S 5/4012 |
| 2017/0075079 A1* | 3/2017 | Lin | G02B 6/4215 |
| 2017/0093488 A1* | 3/2017 | Wang | H04B 10/07955 |
| 2018/0062756 A1* | 3/2018 | Ho | H04B 10/572 |
| 2018/0210156 A1* | 7/2018 | Lin | G02B 6/4263 |

\* cited by examiner

TO-CAN PHOTODIODE PACKAGE WITH INTEGRATED COUPLING MEMBER AND EXPOSED ACTIVE REGION, AND A RECEIVER OPTICAL SUBASSEMBLY (ROSA) USING THE SAME

TECHNICAL FIELD

The present disclosure relates to optical transceiver modules, and more particularly, to a TO-Can photodiode package with an integrated coupling member and non-hermetically sealed, exposed sensor cavity for use in a receiver optical sub-assembly (ROSA).

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, insertion loss, and manufacturing yield.

Optical transceivers can include one or more transmitter optical subassemblies (TOSAs) and receiver optical subassemblies (ROSAs) for the purpose of transmitting and receiving optical signals. As optical transceiver housings scale down in size, the complexity of designing and manufacturing TOSAs and ROSAs to fit within those constrained housings, without sacrificing channel allocation and transceiver performance, continues to increase and raises numerous non-trivial issues.

BRIEF DESCRIPTION OF THE DRAWINGS

These and other features and advantages will be better understood by reading the following detailed description, taken together with the drawings wherein.

DETAILED DESCRIPTION

Figure 1:
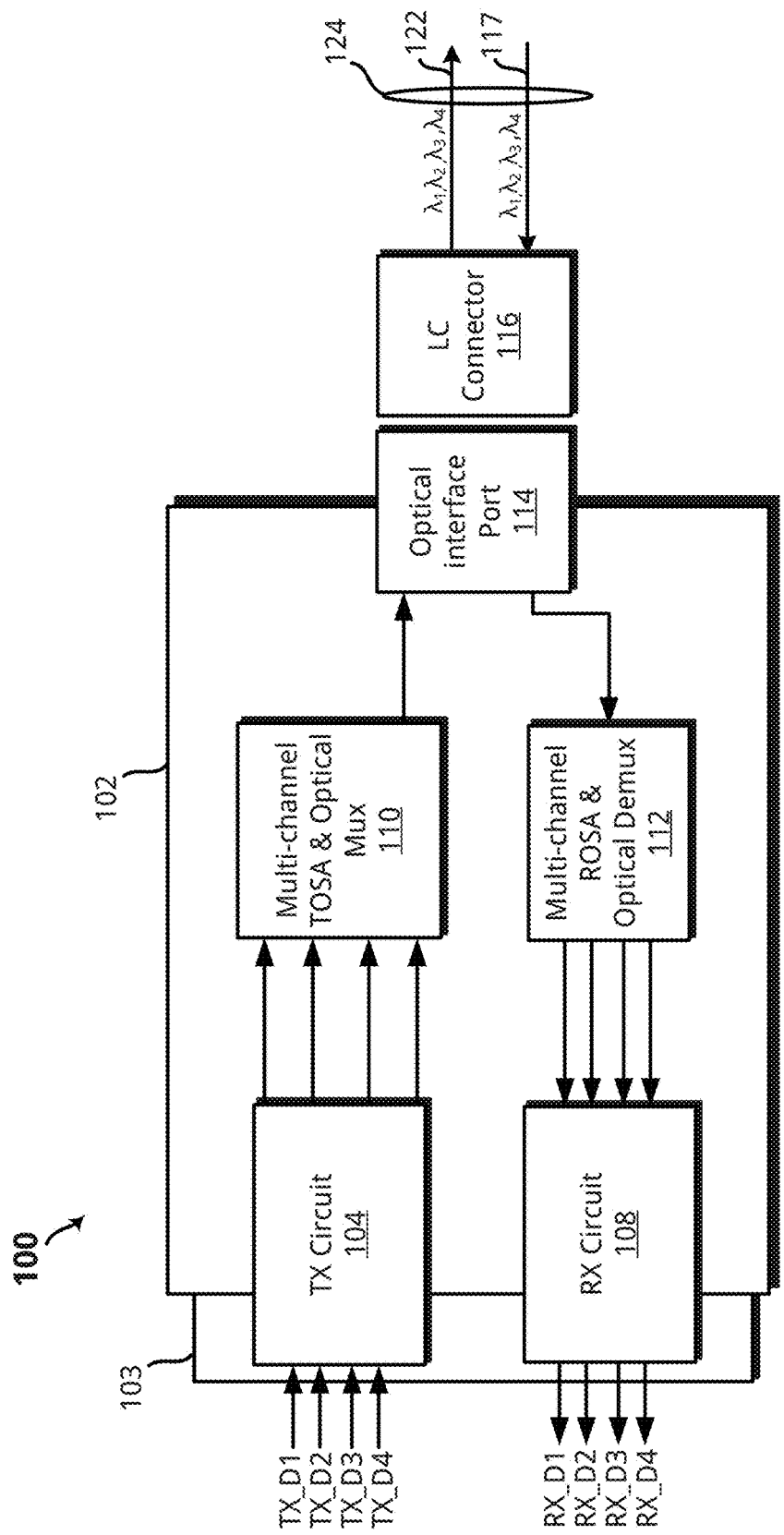
FIG. 1 schematically illustrates an embodiment of an optical transceiver module including a multi-channel transmitter optical sub-assembly (TOSA) and multi-channel receiver optical sub-assembly (ROSA).

Some approaches to photodiode packages for use within receiver optical subassemblies (ROSAs) include TO-Can configurations which are hermetically sealed to prevent introduction of contaminants into active sensor regions. TO-Can packages may be hermetically sealed through an encapsulation process to protect dies, e.g., photodiode chips, from damage after die attachment and wire bonding. Then, TO-Cans may be coupled to a subassembly housing via, for example, a cap or ring welded or otherwise attached to a body of the TO-Can. The TO-Can and attached ring may then be coupled to the subassembly housing via, for example, adhesive and/or welds.

There are two main types of encapsulation for TO-Can packages, namely "Glob Top" and "Dam and Fill." "Glob Top" is an encapsulation process whereby a low viscosity encapsulant is dispensed on top of a die. The encapsulant flows and conforms to the shape of the die without damaging wire bonds. However, the encapsulant can flow beyond the desired area and into adjacent sensitive areas lowering optical power. On the other hand, a controlled partial encapsulation of certain selected regions, e.g., wire bonds, may ensure that the active surface of the device is free from encapsulant. However, such processes require significant investment of time and expertise to select a suitable encapsulant and develop a suitable dispensing process. "Dam and Fill" encapsulant uses a dam around the die area to control the encapsulant flow within a contained area. This process may result in a much flatter encapsulation profile, but requires dispensing two or more encapsulant materials at precise times during an automated dispense process. In either case, continued scaling of optical modules, such as ROSAs, depends in part on development of photodiode packages that provide nominal optical performance without necessarily requiring encapsulation processes.

Thus, in accordance with an embodiment of the present disclosure, a photodiode package is disclosed that includes a TO-Can style body and an exposed sensor cavity (or optical coupling cavity) that eliminates the necessity of an encapsulant dispensing process. As generally referred to herein, an exposed optical coupling cavity thus refers to a cavity without encapsulant or other filler material disposed therein that conventional TO-Can photodiode packages utilize to form a hermetic seal. The TO-Can body of the photodiode package includes an integrated coupling member (or cap portion) to allow for coupling to a ROSA housing without the necessity of an intermediate member such as a ring or cap.

In accordance with an embodiment, the photodiode package includes a base portion with a cylindrical wall portion that extends therefrom to form an optical coupling cavity. A surface of the base portion provides at least one mounting surface within the optical coupling cavity for coupling to a photodiode chip (also known as a die), for example, to form an active region for detecting received channel wavelengths. The cylindrical wall, which may also be referred to as a wall portion, may operate as an integrated coupling member and may be used to directly couple the photodiode package, e.g., without an intermediate cap/ring, into a socket of a receiver optical subassembly (ROSA) housing. The base portion and cylindrical wall portion may be formed from a single piece of material, or from multiple pieces depending on a desired configuration. The cylindrical wall portion may form a frictional connection within an associated socket of a ROSA housing. Alternatively, or in addition to forming a friction-fit, adhesive such as a thermal epoxy may be used to couple the photodiode package into an associated socket. A plurality of through-holes may be disposed through the base portion to receive electrical leads. Electrical leads may be disposed within the through holes, with a first end of each electrical lead extending at least partially into the optical coupling cavity and a second end extending from the base portion away from the optical coupling cavity. The first end of each electrical lead may be electrically coupled to the photodiode chip via, for example, wire bonding.

The second end of each electrical lead, which may also be referred to as an electrical coupling end, may be electrically coupled to associated amplification and detection circuitry, e.g., a transimpedance amplifier (TIA), via a flexible printed circuit (FPC) or other suitable electrical interconnect device. Once coupled into an associated socket within a ROSA housing, channel wavelengths may be launched into the optical coupling cavity, and by extension, into an optical window of a photodiode chip mounted in the optical coupling cavity. Optical signals may then be detected and converted by the photodiode chip (or sensor die) to a proportional electrical signal and passed into the electrical leads via, for instance, wire bonds that couple the photodiode chip to each electrical lead. Electrical signals representing received channel wavelengths may then be passed to associated amplification and detection circuitry via the electrical leads.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid or course wavelength division multiplexing (CWDM). The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

Example Optical Transceiver System

Now turning to FIG. 1, there is an optical transceiver 100 consistent with embodiments of the present disclosure. In more detail, the optical transceiver 100 transmits and receives four (4) channels using four different channel wavelengths ($\lambda_1$, $\lambda_2$, $\lambda_3$, $\lambda_4$) and may be capable of transmission rates of at least about 10 Gbps per channel. In one example, the channel wavelengths $\lambda_1$, $\lambda_2$, $\lambda_3$, $\lambda_1$ may be 1270 nm, 1290 nm, 1310 nm, and 1330 nm, respectively. The optical transceiver 100 may also be capable of transmission distances of 2 km to at least about 10 km. The optical transceiver 100 may be used, for example, in internet data center applications or fiber to the home (FTTH) applications. In an embodiment, the optical transceiver 100 implements the specification SFF-8436 titled "QSFP+10 Gbs 4× PLUGGABLE TRANSCEIVER Rev 4.8" (hereinafter QSFP+), published on Oct. 31, 2013 by the Electronic Industries Alliance (EIA).

This embodiment of the optical transceiver 100 includes a multi-channel TOSA 110 for transmitting optical signals on different channel wavelengths, and a multi-channel ROSA 112 for receiving optical signals on different channel wavelengths. As shown, the transceiver housing 102 includes the multi-channel TOSA 110 and the multi-channel ROSA 112. A transmit connecting circuit 104 and a receive connecting circuit 108 provide electrical connections to the multi-channel TOSA 110 and the multi-channel ROSA 112, respectively, within the transceiver housing 102. The transmit connecting circuit 104 and the receive connecting circuit 108 may communicate with external systems via data bus 103. In some cases, data bus 103 is a 38-pin connector that comports with physical connector QSFP standards and data communication protocols.

In any event, the transmit connecting circuit 104 electrically couples to the electronic components in the multi-channel TOSA 110 (e.g., TO-Can laser packages), and the receive connecting circuit 108 electrically couples to the electronic components (e.g., the photodiode packages) in the multi-channel ROSA 112. The transmit connecting circuit 104 and the receive connecting circuit 108 include at least conductive paths to provide electrical connections, and may also include additional circuitry. The multi-channel TOSA 110 transmits and multiplexes multiple different channel wavelengths, and is coupled to an optical interface port 114. The optical interface port 114 may include an LC connector port, although other connector types are also within the scope of this disclosure.

In cases where the optical interface port 114 comprises a duplex, or bi-directional, LC receptacle, the LC connector receptacle provides optical connections to the multi-channel TOSA 110, and provides optical connections to the multi-channel ROSA 112. The LC connector receptacle may be configured to receive and be coupled to a mating LC connector 116 such that transmit optical fiber 122 of the external fibers 124 optically couples to the multi-channel TOSA 110, and the receive optical fiber 117 of the external fibers 124 optically couples to the multi-channel ROSA 112.

The multi-channel TOSA 110 includes multiple TO-Can laser packages and optics for producing associated channel wavelengths, and couples the same into the transmit optical fiber 122. In particular, the lasers in the multi-channel TOSA 110 convert electrical data signals (TX_D1 to TX_D4) received via the transmit connecting circuit 104 into modulated optical signals transmitted over transmit optical fiber 122. The lasers may include, for example, distributed feedback (DFB) lasers with diffraction gratings. The multi-channel TOSA 110 may also include monitor photodiodes for monitoring the light emitted by the lasers. The multi-channel TOSA 110 may further include one or more temperature control devices, such as a resistive heater and/or a thermoelectric cooler (TEC), for controlling a temperature of the lasers, for example, to control or stabilize the laser wavelengths.

The multi-channel ROSA 112 includes multiple photodiode packages, and optics such as mirrors and filters for receiving a multiplexed optical signal and de-multiplexing the same into associated channel wavelengths, as discussed in further detail below. The multi-channel ROSA 112 can detect, amplify, and convert such optical signals received via receive optical fiber 117, and can provide the converted optical signals as electrical data signals (RX_D1 to RX_D4) that are output via the receive connecting circuit 108. In some cases, the photodiode packages can include integrated transimpedance amplifiers (TIAs).

This embodiment of the optical transceiver 100 includes 4 channels and may be configured for coarse wavelength division multiplexing (CWDM), although other numbers of channels are possible.

Figure 2A:
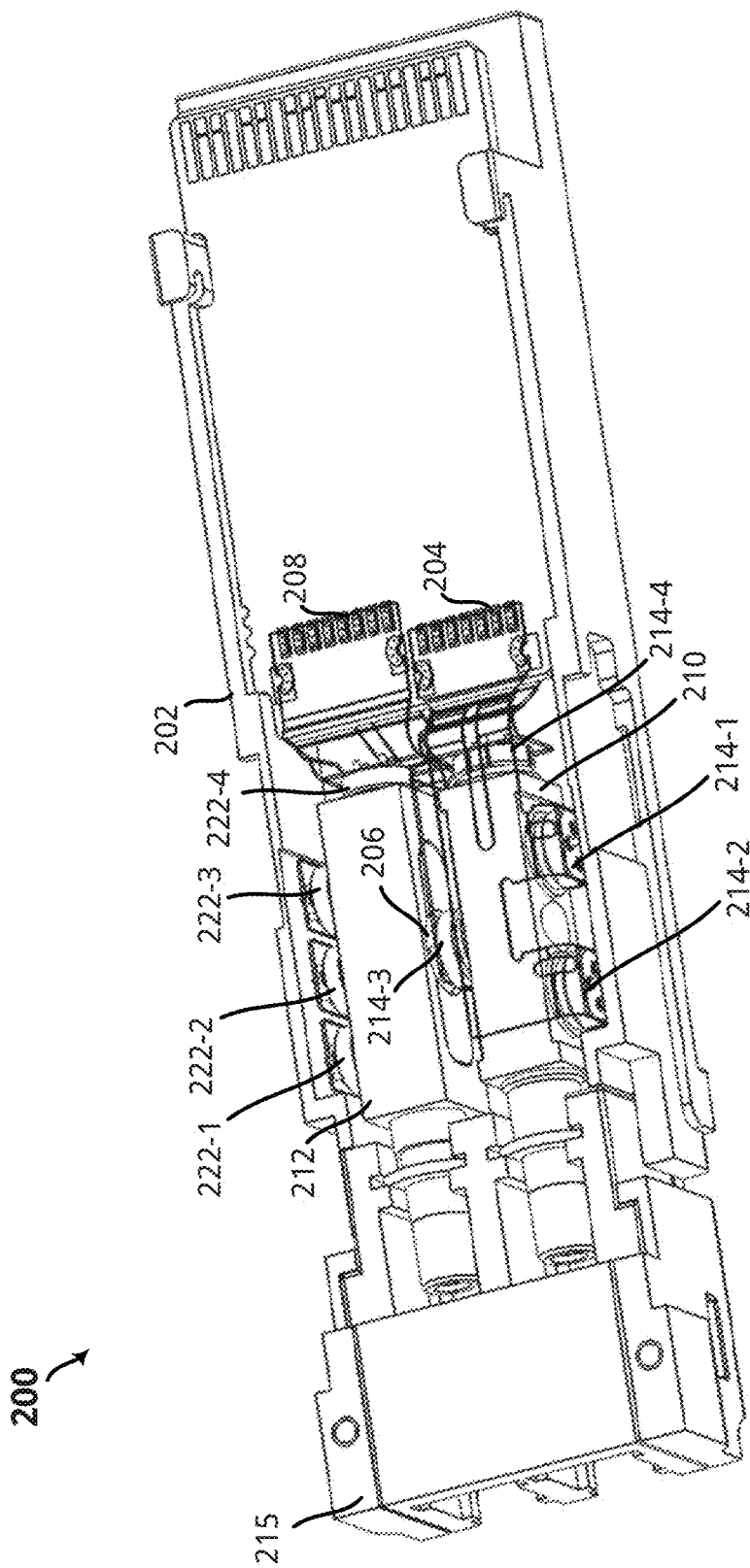
FIG. 2A is a perspective view of an example small form-factor (SFF) pluggable transceiver with a multi-channel TOSA and a multi-channel ROSA, in accordance with an embodiment of the present disclosure.

Referring to FIG. 2A, an example small form-factor (SFF) pluggable optical transceiver 200 with a multi-channel TOSA and a multi-channel ROSA is described and shown in greater detail. The embodiment shown in FIG. 2A is one example of the optical transceiver 100 of FIG. 1 implemented in a small form-factor. For example, the optical transceiver 200 may implement the QSFP+ specification. As shown, the optical transceiver 200 includes a transceiver housing 202, a multi-channel TOSA 210 in one region of the housing 202, and a multi-channel ROSA 212 located in another region of the housing 202. The multi-channel TOSA 210 electrically couples to transmit flexible printed circuits (FPCs) 204 and couples to the optical interface port 215 at an end of the housing 202. The multi-channel ROSA 212 electrically couples to a receive FPC 208, and couples to the optical interface port 215 at the end of the housing 202.

The multi-channel TOSA 210 includes TO-Can laser packages 214-1 to 214-4, with each containing optical components such as a laser diode. The TO-Can laser packages 214-1 to 214-4 may provide, for example, output power from 1.85 mW to 2 W, although other output power is within the scope of this disclosure. The TO-Can laser packages 214-1 to 214-4 may provide a broad spectrum of channel wavelengths, or may be configured to provide a relatively narrow spectrum of channel wavelengths such as a single channel wavelength. In some cases, the TO-Can laser packages 214-1 to 214-4 provide center wavelengths 375 nm to 1650 nm, for example. In an embodiment, the TO-Can laser packages 214-1 to 214-4 are Ø3.8 mm, Ø5.6 mm, or Ø9 mm TO-Cans, although other configurations are also within the scope of this disclosure. For instance, the TO-Can laser packages can include Ø9.5 mm and and/or TO-46 cans.

The multi-channel ROSA 212 includes photodiode packages 222-1 to 222-4, with each containing optical components such as a photodiode and TIA, for example. In some cases, the photodiodes can provide about –13 dBm sensitivity, or less, for each associated channel wavelength. In an embodiment, the photodiode packages are TO-33 packages, although other package types are also within the scope of this disclosure. The photodiode packages can be implemented as the photodiode package 222-N discussed in greater detail below with reference to FIGS. 3-6.

Figure 2B:
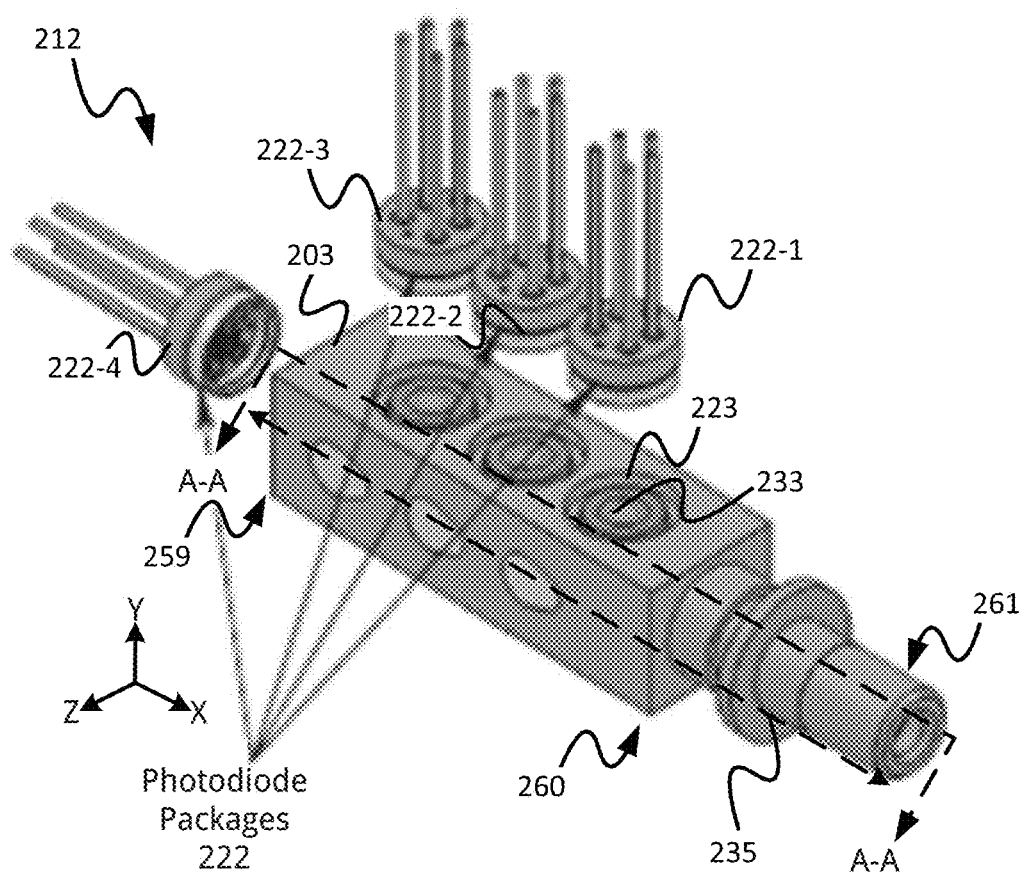
FIG. 2B is a perspective view of the multi-channel ROSA of FIG. 2A, in accordance with an embodiment of the present disclosure.
Figure 2C:
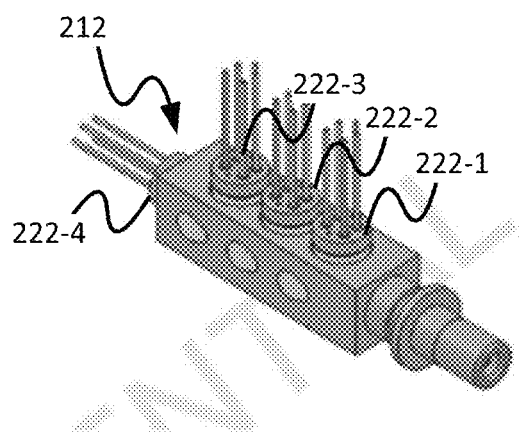
FIG. 2C is another perspective view of the multi-channel ROSA of FIG. 2A, in accordance with an embodiment of the present disclosure.

Referring to FIGS. 2B and 2C, a multi-channel ROSA 212 suitable for use in the optical transceiver 200 of FIG. 2A is shown in accordance with an embodiment of the present disclosure. As shown, the multi-channel ROSA 212 includes a housing 203 and a plurality of photodiode package sockets (or sockets), e.g., socket 223. The housing 203 includes a plurality of sidewalls extending from a first end 259 to a second end 260 along the longitudinal axis 235. An optical coupling receptacle 261 may be disposed at the second end 260 of the housing 203, with the optical coupling receptacle 261 being configured to receive an optical fiber, for example.

In an embodiment, the sockets may be disposed in a linear array along a longitudinal axis of the housing 203 with uniform spacing relative to each other, e.g., as shown in FIG. 2B, although other configurations are within the scope of this disclosure. Each socket is configured to receive one of the plurality of photodiode packages shown collectively as 222 and individually as 222-1 to 222-4. Each photodiode package couples to an associated socket via, for example, thermal epoxy or other suitable adhesive. Alternatively, or in addition, each photodiode package may couple to an associated socket via one or more welds. The ROSA 212 may include N number of photodiode packages and is not necessarily limited to the four (4) shown. Each socket may include a focusing lens, e.g., focusing lens 233, to focus and provide channel wavelengths into an associated photodiode package for detection purposes.

Figure 2D:
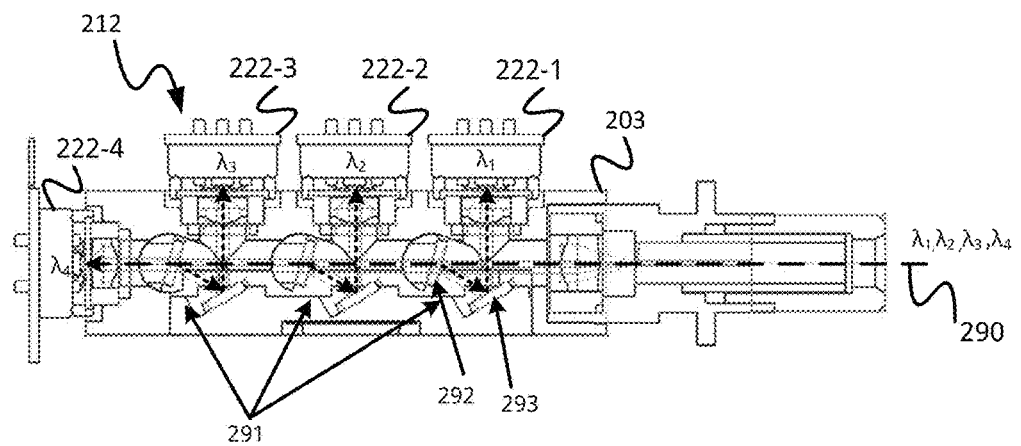
FIG. 2D is a cross-sectional view of the multi-channel ROSA of FIG. 2B taken along the line A-A, in accordance with an embodiment of the present disclosure.

FIG. 2D shows a cross-sectional view of the multi-channel ROSA 212 taken along the line A-A of FIG. 2B, in accordance with an embodiment of the present disclosure. As shown, the ROSA includes an optical demultiplexing arrangement 291 disposed along light path 290 to receive a multiplexed optical signal and separate the same into constituent channel wavelengths. The demultiplexing arrangement 291 includes one or more active and/or passive optical components such as filters, mirrors, and so on, to launch de-multiplexed channel wavelengths to an associated photodiode package. For example, a first channel wavelength $\lambda 1$ may be reflected by a filter 292, e.g., a thin-film wavelength division multiplexed (WDM) filter, with the reflected wavelength being launched along an orthogonal light path relative to the light path 290 to the photodiode package 222-1. In turn, the photodiode package 222-1 may detect, amplify, and convert the first channel wavelength $\lambda 1$ into an electrical signal. The photodiode package 222-1 may provide the electrical signal to the receive connecting circuitry 108 via a flexible printed circuit board (not shown). In a similar manner, the demultiplexing arrangement 291 may de-multiplex each of the remaining channel wavelengths, $\lambda 2 \ldots \lambda 4$, and project the de-multiplexed channel wavelengths into an associated photodiode package for detection purposes.

Figure 3:
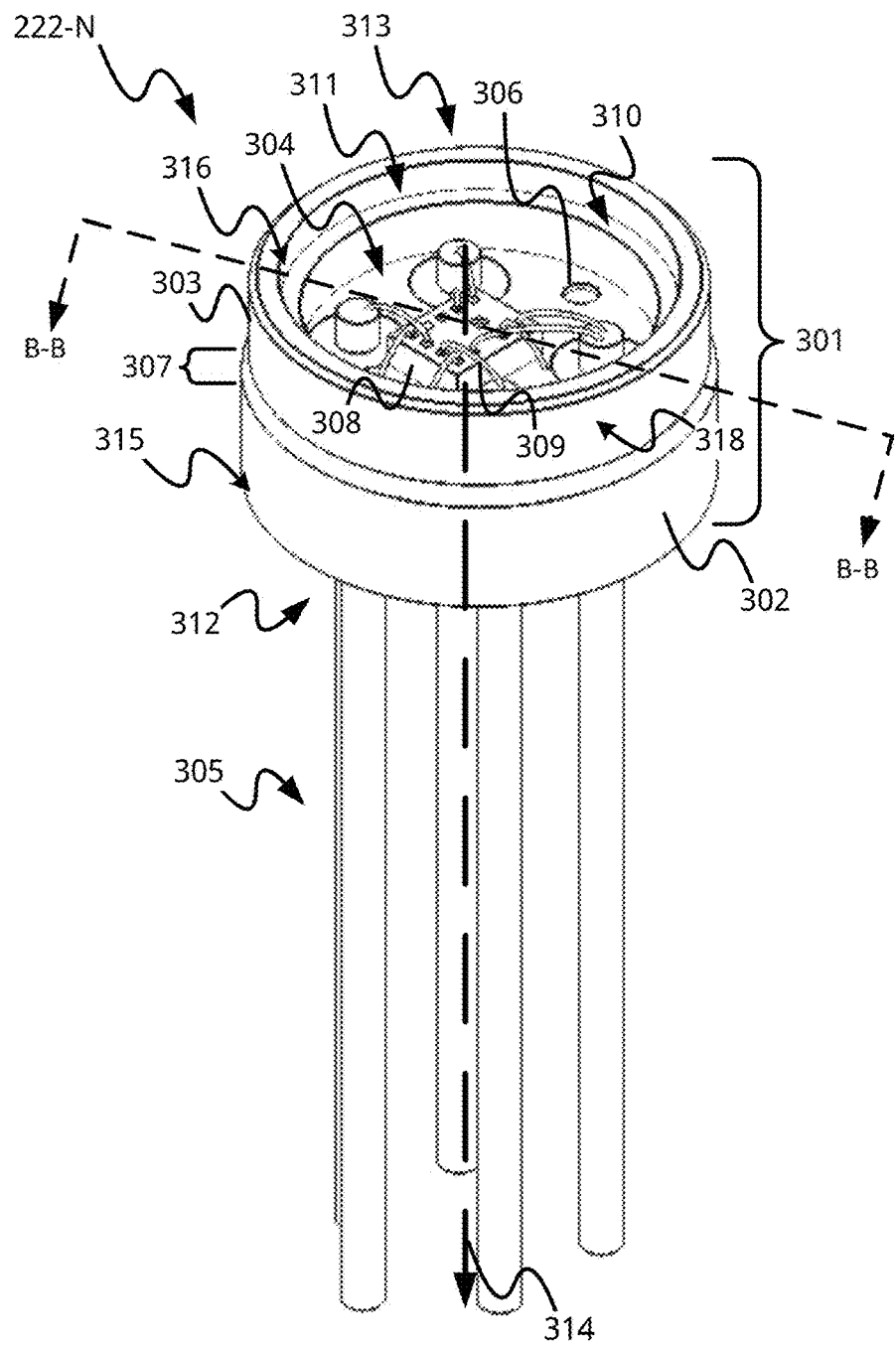
FIG. 3 shows an example photodiode package in accordance with an embodiment of the present disclosure.

Turning to FIG. 3, a photodiode package 222-N is shown in accordance with an embodiment of the present disclosure. As shown, the photodiode package 222-N includes a base portion 302 and a wall portion 303 that collectively define a header portion 301. The photodiode package 222-N further includes electrical leads 305 extending parallel relative to the longitudinal axis 314. The header portion 301 extends from an electrical coupling end 312 to an optical coupling end 313 along a longitudinal/central axis 314.

The header portion 301 may be formed from a metal or metal alloy. The base portion 302 and the wall portion 303 may form a unitary structure formed from a single piece of material. In other cases, the base portion 302 and the wall portion 303 may be formed from two or more different pieces. In these cases, the base portion 302 and the wall portion 303 may be formed from a same or different material.

The base portion 302 has a generally cylindrical shape defined by a cylindrical surface 315 that extends around a perimeter of the same. The base portion 302 also includes a mounting surface 304 for coupling to one or more optical components, e.g., such as photodiode chip 308. The mounting surface 304 may be substantially flat, although other embodiments are within the scope of this disclosure. The wall portion 303 extends from the base portion 302 transverse relative to the mounting surface 304 and parallel relative to the longitudinal/central axis 314 of the header portion 301. The wall portion 303 is defined by an outer cylindrical surface 318 disposed opposite of an inner cylindrical surface 316. The wall portion 303 and the base portion 302 may be coaxial. An optical coupling cavity 311 is formed at least in part by the mounting surface 304 and the inner cylindrical surface 316. The optical coupling cavity 311 may also be referred to as an exposed optical coupling cavity 311. As generally referred to herein, an exposed optical coupling cavity refers to a cavity without encapsulant or other filler material disposed therein that conventional TO-Can photodiode packages utilize to form a hermetic seal. To this end, an air gap may be formed between the optical component, e.g., a photodiode chip, and the focusing lens 233 when the photodiode package is coupled into the housing 203 of the ROSA 212. The optical coupling cavity 311 may include a reference marker 306. A tapered region 307 may be formed between the base portion 302 and the wall portion 303.

Figure 4:
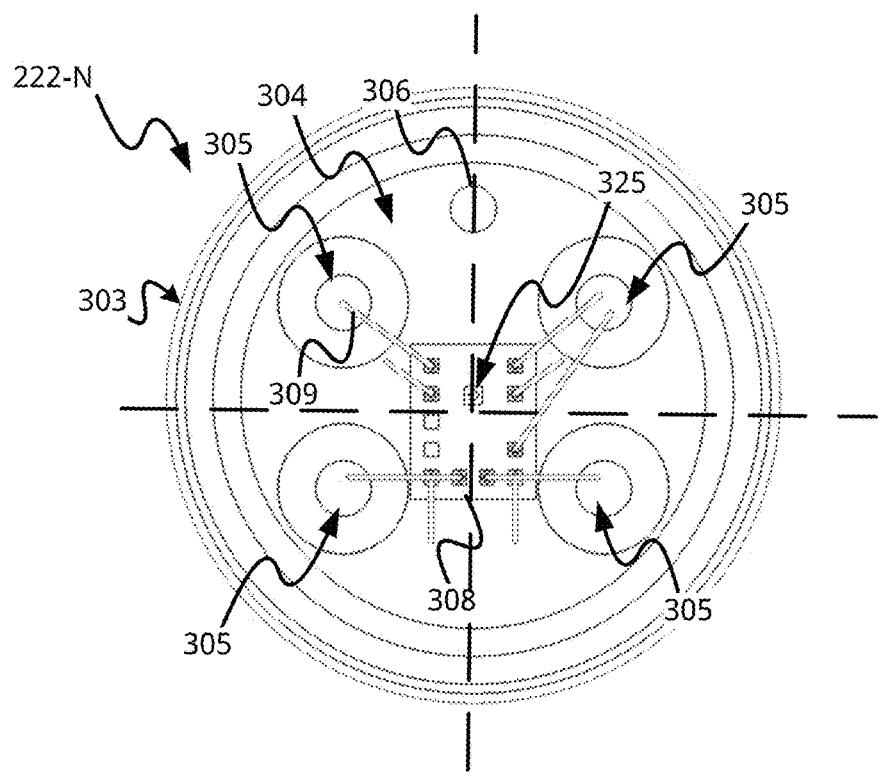
FIG. 4 shows a top plan view of the photodiode package of FIG. 3 in accordance with an embodiment of the present disclosure.

Turning to FIG. 4, a top view of the photodiode package 222-N is shown in accordance with an embodiment of the present disclosure. As shown, the photodiode chip 308 (or die) is coupled at about the center of the mounting surface 304. A plurality of openings 317 extend through the base portion 302, which are shown more clearly in FIG. 6. Each of the plurality of openings 317 may be configured to receive an electrical lead 305. The photodiode package 308 may be electrically coupled to the plurality of electrical leads via an interconnect device 309. In an embodiment, the interconnect device 309 may comprise wire bonding formed from gold, copper, silver, aluminum, or other suitable metal. The photodiode package 308 may include a sensor region 325 with an optical window for detecting channel wavelengths that extends substantially perpendicular from the mounting surface 304.

Figure 5:
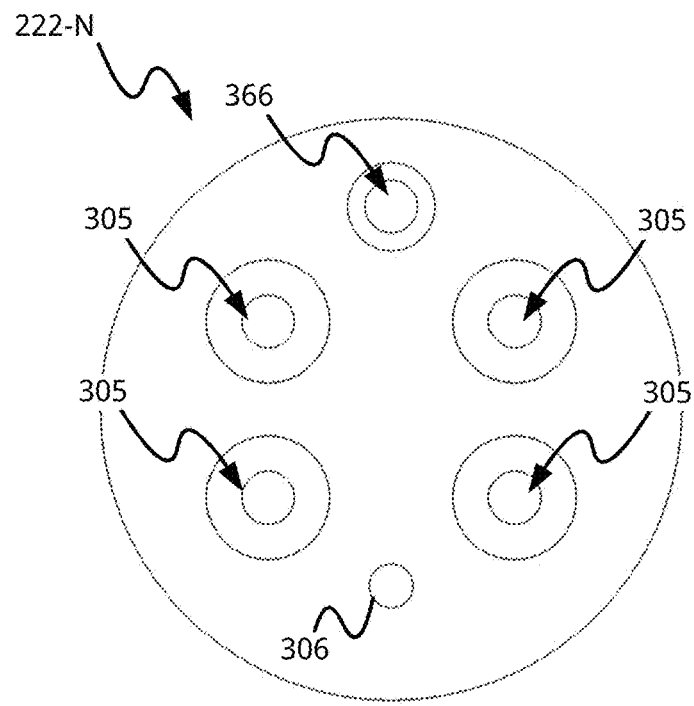
FIG. 5 shows a bottom plan view of the photodiode package of FIG. 3 in accordance with an embodiment of the present disclosure.

FIG. 5 shows a bottom view of the photodiode package 222-N in accordance with an embodiment of the present disclosure. As shown, a plurality of electrical leads 305 extend from the base portion 302. In addition, a ground lead 366 may also extend from the base portion 302.

Figure 6:
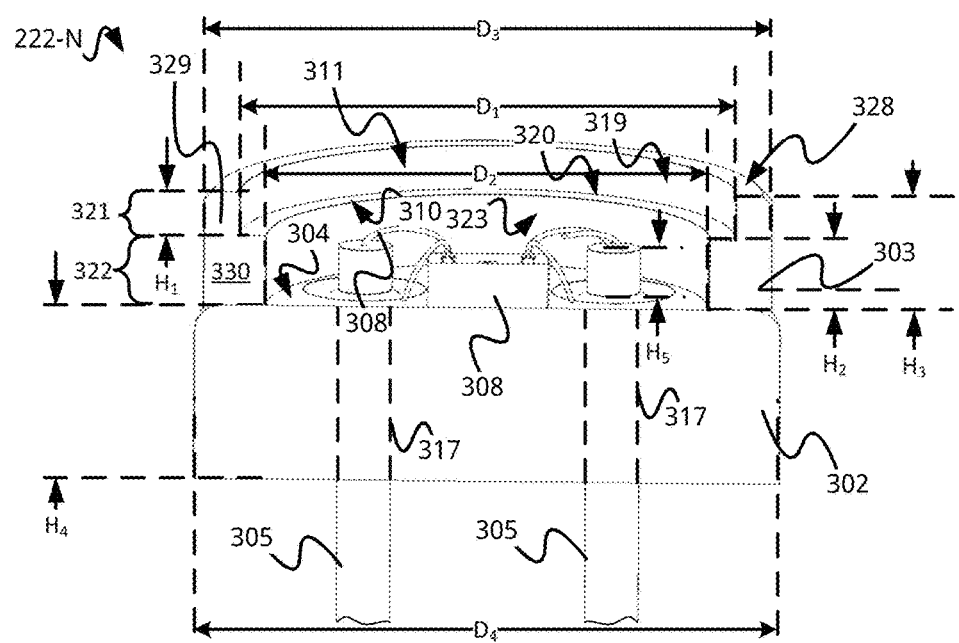
FIG. 6 shows a cross-sectional view of the photodiode package of FIG. 3 taken along the line B-B, in accordance with an embodiment of the present disclosure.

Turning to FIG. 6, a cross-sectional view of the photodiode package 222-N of FIG. 3 is shown taken along line B-B. As shown, the wall portion 303 includes a lip 328 (or rim 328) that extends around a perimeter of the wall 303. The wall portion 303 may further include an inner lip/rim 310 defined at least in part by a first surface 319 that extends from the lip 328 into the optical coupling cavity 311, a second surface 320 that projects substantially perpendicular from the first surface 319 into the optical coupling cavity 311, and a third surface 323 that extends substantially perpendicular relative to the second surface 320 towards the mounting surface 304. The inner lip 310 may also be referred to as a shoulder.

The optical coupling cavity 311 may therefore include multiple regions, with a first (or upper) region 321 extending from the second surface 320 to the rim/lip 328 and having a first diameter $D_1$, and a second region 322 extending from the mounting surface 304 to the second surface 320 and having a second diameter $D_2$, with the first diameter $D_1$ being greater than the second diameter $D_2$. The respective first and second diameters $D_1$ and $D_2$ may be provided at least in part by a thicker portion of the wall portion 303 within the second region 322 relative to the first region 321. In some cases, the thickness of the wall portion 303 in the first region 321 relative to the second region 322 is a range of ratios such as, for example, 1:1 to 1:1.5 including all ranges therebetween, although this disclosure is not necessarily limited in this regard and other ratios are within the scope of this disclosure.

Continuing with FIG. 6, each cross-section of the first region 321 taken perpendicular to the longitudinal axis 314 may define a first substantially rectangular portion 329. Likewise, each cross-section of the second region 322 taken perpendicular to the longitudinal axis 314 may define a second substantially rectangular portion 330. The aspect ratio of the first rectangular portion 329 relative to the second rectangular portion 330 may be within a range of ratios such as, for example, 1:1 to 1:1.5 including all ranges there between, although this disclosure is not necessarily limited in this regard and other ratios are within the scope of this disclosure.

The first region 321 may include a first height $H_1$ that is equal to or less than a second height $H_2$ of the second region 322. In some cases, the ratio of the first height $H_1$ of the first region 321 relative to the second height $H_2$ of the second region 322 is a range of ratios such as, for example, 1:1 to 1:1.5 including all ranges therebetween, although other ratios are within the scope of this disclosure. The overall height $H_3$ of the wall portion 303 may therefore be the sum of the first and second height $H_1$ and $H_2$ of the first and second regions 321 and 322, respectively. The base portion 302 may include a height $H_4$ that is equal to or greater than the overall height $H_3$ of the wall portion. For example, the height $H_4$ of the base portion 302 relative to the overall height $H_3$ of the wall portion may be within a range of ratios such as, for example, 1:1 to 2:1 including all ranges therebetween, although this disclosure is not necessarily limited in this regard and other ratios are within the scope of this disclosure. Likewise, the diameter $D_4$ of the base portion 302 may be equal to or greater than the overall diameter $D_3$ of the wall portion 303. In an embodiment, at least a portion of the wall portion 303 extends into an associated socket 223 of the housing 203 (FIG. 2B) when coupling the photodiode package 222-N to the same, which is shown more clearly in FIG. 2C.

Still with reference to FIG. 6, each electrical lead 305 includes an end that extends at least partially above surface 304. In some cases, each electrical lead 305 extends to a height of $H_5$, with $H_5$ being less than the second height $H_2$ of the second region 322. This may advantageously allow for wire bonds 309 to be coupled to each electrical lead without extending into the first region 321 of the optical coupling cavity 311. Accordingly, this may allow each focusing lens 233 (FIG. 2B) to extend at least partially within the first region 321 of the optical coupling cavity 311 without damaging, or being damaged by, the electrical leads 305 and associated wire bonding 309. Moreover, this allows the photodiode package 222-N to form a seal to substantially prevent light from escaping, e.g., to keep 80% or more of light from escaping between the photodiode package 222-N and the housing 203, to ensure nominal optical power. The first region 321 of the wall portion 303 may further provide protective barrier when, for instance, adding a thermal epoxy to die bond the photodiode package 222-N, to prevent adhesive material from entering the optical coupling cavity 311 and potentially damaging optical components, and by extension, optical power.

Further Example Aspects

In accordance with an aspect of the present disclosure a photodiode package for use in a receiver optical subassembly (ROSA) is disclosed. The photodiode package comprises a base portion having a first cylindrical sidewall extending from a first end to a second end along a longitudinal axis, a mounting surface for coupling to at least one optical component disposed at the first end of the base portion, the mounting surface extending substantially transverse relative to the longitudinal axis of the base portion, a second cylindrical sidewall extending from base portion at the first end, the second cylindrical sidewall having an outer surface extending away from the base portion and an inner surface disposed opposite the outer surface, and an optical coupling cavity defined at least in part by the mounting surface of the base portion and the inner surface of the second cylindrical sidewall.

In accordance with another aspect of the present disclosure an optical transceiver module is disclosed. The optical transceiver module comprising a multi-channel receiver optical sub-assembly (ROSA) having a plurality of sockets for coupling to photodiode packages, and at least one photodiode package coupled into a socket of the plurality of sockets, the at least one photodiode package comprising a base portion having a first cylindrical sidewall extending from a first end to a second end along a longitudinal axis, a mounting surface for coupling to at least one optical component disposed at the first end of the base portion, the mounting surface extending substantially transverse relative to the longitudinal axis of the base portion, a second cylindrical sidewall extending from base portion at the first end, the second cylindrical sidewall having an outer surface extending away from the base portion and an inner surface disposed opposite the outer surface, and an optical coupling cavity defined at least in part by the mounting surface of the base portion and the inner surface of the second cylindrical sidewall.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A photodiode package for use in a receiver optical subassembly (ROSA), the photodiode package comprising:
    a base portion having a first cylindrical sidewall extending from a first end to a second end along a longitudinal axis;
    a mounting surface for coupling to at least one optical component disposed at the first end of the base portion, the mounting surface extending substantially transverse relative to the longitudinal axis of the base portion;
    a second cylindrical sidewall extending from the base portion at the first end, the second cylindrical sidewall having an outer surface extending away from the base portion and an inner surface disposed opposite the outer surface; and
    an exposed optical coupling cavity defined at least in part by the mounting surface of the base portion and the inner surface of the second cylindrical sidewall.

2. The photodiode package of claim 1, wherein the base portion and second cylindrical sidewall are integrally formed from a single piece of metal or metal alloy.

3. The photodiode package of claim 1, wherein the optical coupling cavity includes a first region having a first diameter $D_1$ and a second region having a second diameter $D_2$, and wherein the first diameter $D_1$ is greater than the second diameter $D_2$.

4. The photodiode package of claim 3, wherein the first region is configured to receive at least a portion of a focusing lens.

5. The photodiode package of claim 3, further comprising a plurality of electrical leads that extend through the base portion, each of the electrical leads including a first portion that extends partially through the first region of the optical coupling cavity and a second portion that extends from the second end of the base portion.

6. The photodiode package of claim 5, further comprising the optical component coupled to the mounting surface, wherein the optical component is a photodiode chip.

7. The photodiode package of claim 6, wherein the plurality of electrical leads are electrically coupled to the optical component via wire bonding.

8. The photodiode package of claim 7, wherein the wire bonding is disposed within the second region of the optical coupling cavity below the first region.

9. The photodiode package of claim 1, wherein the mounting surface comprises a reference marker.

10. The photodiode package of claim 1, wherein the photodiode package is implemented as a TO-33 photodiode package.

11. An optical transceiver module comprising:
    a multi-channel receiver optical sub-assembly (ROSA) having a plurality of sockets for coupling to photodiode packages; and
    at least one photodiode package coupled into a socket of the plurality of sockets, the at least one photodiode package comprising:
        a base portion having a first cylindrical sidewall extending from a first end to a second end along a longitudinal axis;
        a mounting surface for coupling to at least one optical component disposed at the first end of the base portion, the mounting surface extending substantially transverse relative to the longitudinal axis of the base portion;
        a second cylindrical sidewall extending from the base portion at the first end, the second cylindrical sidewall having an outer surface extending away from the base portion and an inner surface disposed opposite the outer surface; and
        an exposed optical coupling cavity defined at least in part by the mounting surface of the base portion and the inner surface of the second cylindrical sidewall.

12. The optical transceiver module of claim 11, wherein the base portion and second cylindrical sidewall of the at least one photodiode package are integrally formed from a single piece of metal or metal alloy.

13. The optical transceiver module of claim 11, wherein the optical coupling cavity of the at least one photodiode package includes a first region having a first diameter $D_1$ and a second region having a second diameter $D_2$, and wherein the first diameter $D_1$ greater than the second diameter $D_2$.

14. The optical transceiver module of claim 13, wherein the first region of the at least one photodiode package is configured to receive at least a portion of a focusing lens.

15. The optical transceiver module of claim 13, wherein the at least one photodiode package further comprises a plurality of electrical leads that extend through the base portion, each of the electrical leads including a first portion that extends partially through the first region of the optical coupling cavity and a second portion that extends from the second end of the base portion.

16. The optical transceiver module of claim 15, further comprising the optical component coupled to the mounting surface of the at least one photodiode package, wherein the optical component is a photodiode chip.

17. The optical transceiver module of claim 16, wherein the plurality of electrical leads of the at least one photodiode package are electrically coupled to the photodiode chip via wire bonding.

18. The optical transceiver module of claim 17, wherein the wire bonding is disposed within the second region of the optical coupling cavity of the at least one photodiode package below the first region.

19. The optical transceiver module of claim 11, wherein the optical transceiver module is a Quad Small Form-factor Pluggable (QSFP) transceiver module and the ROSA is configured to receive at four different channel wavelengths at transmission rates of at least about 10 Gbps per channel.

20. The photodiode package of claim 1, wherein at least a portion of the first and/or second cylindrical sidewall provide an integrated coupling member for directly coupling the photodiode package to a receiver optical subassembly (ROSA) housing.

* * * * *